Sept. 10, 1940.  W. FERRIS  2,214,552
CONTROLLER FOR HYDRODYNAMIC MACHINES
Filed April 1, 1937
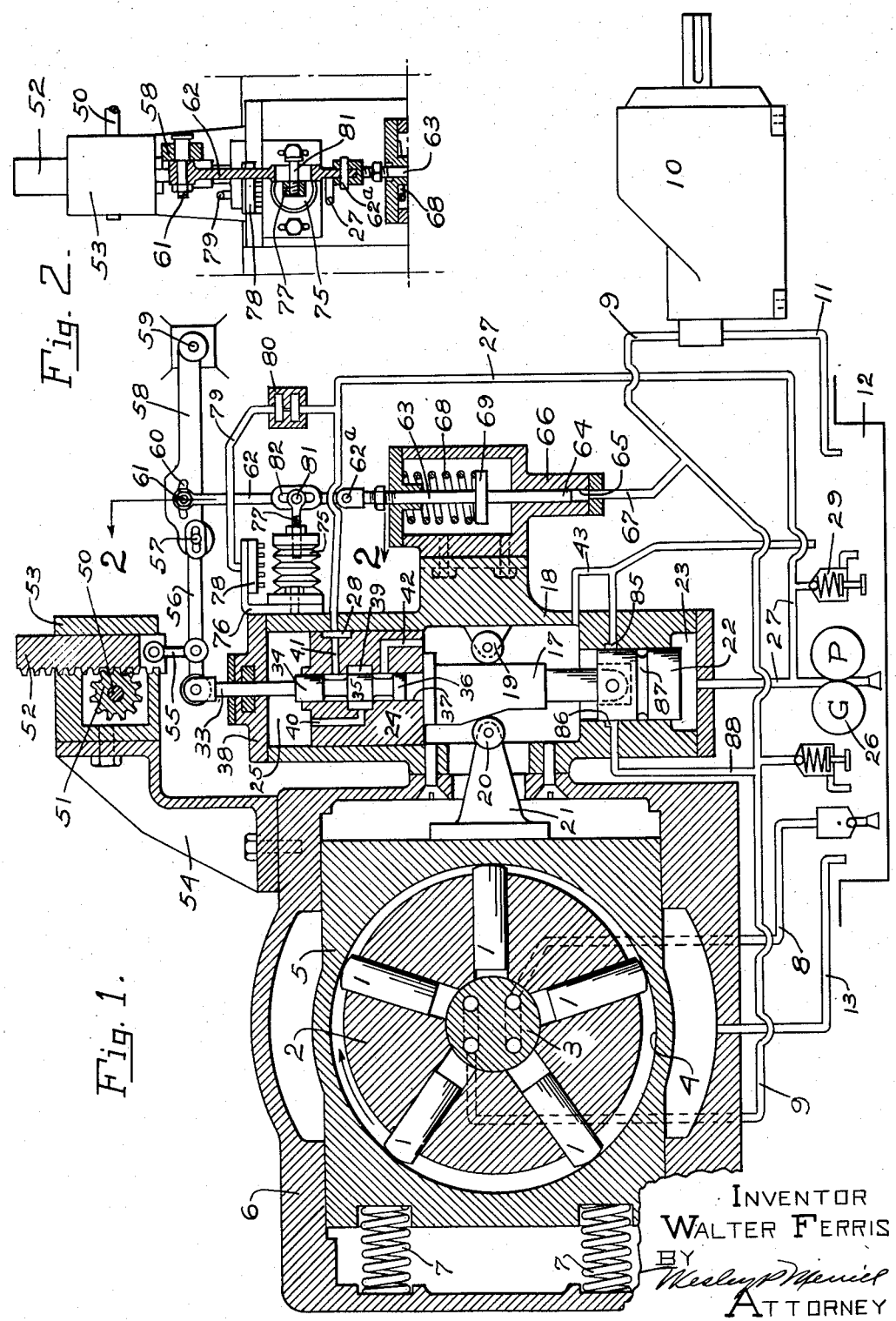
INVENTOR
WALTER FERRIS
BY
ATTORNEY Patented Sept. 10, 1940

2,214,552

UNITED STATES PATENT OFFICE 2,214,552

CONTROLLER FOR HYDRODYNAMIC MACHINES

Walter Ferris, Milwaukee, Wis., assignor to The Oilgear Company, Milwaukee, Wis., a corporation of Wisconsin Application April 1, 1937, Serial No. 134,205

12 Claims. (Cl. 103—38)

This invention relates to controllers for rotary hydrodynamic machines of the type which when driven mechanically will function as pumps and when supplied with liquid under pressure will function as motors.

The hydrodynamic machine to which the invention applies in particular is adapted to have its displacement varied to thereby vary its volumetric delivery if it is functioning as a pump or to vary its speed if it is functioning as a motor.

Rotary hydrodynamic machines have as an inherent characteristic thereof an internal leakage or slip which is composed primarily of small volumes which leak out of the pump valve and other small volumes which pass across the face of the pump valve from the high pressure port to the low pressure port. This slip or leakage varies in accordance with variations in the pressure and the viscosity of the driving liquid which is ordinarily a good grade of lubricating oil.

Therefore, a hydrodynamic machine must be adjusted to compensate for variations in slip in order that its volumetric delivery may be maintained constant if it is functioning as a pump or to maintain its speed constant if it is functioning as a motor. Also, if two such machines are hydraulically connected to form a transmission, either one machine must be adjusted to compensate for the variations in the slip of both machines or each machine must be adjusted to compensate for the variations in its own slip in order to maintain the output speed of the transmission constant.

The pressure varies in accordance with variations in the load carried by the motor and the viscosity of the oil varies in accordance with the temperature thereof. The variation in slip due to one of these factors is also dependent upon the other factor. For example, the slip resulting from a given increase in pressure when the liquid has a given high temperature might be twice as great as the slip resulting from the same change in pressure when the liquid has a given low temperature. Conversely, the slip resulting from a given increase in temperature when the pressure is high might be twice as great as the slip resulting from the same change in temperature when the pressure is low.

Therefore, an adjustment of the machine to compensate for variations in slip resulting from one factor should always be made in view of the condition created in the liquid by the other factor if the net delivery of the pump or the speed of the motor is to be maintained uniformly constant.

The present invention has as an object to provide a controller which will automatically adjust a hydrodynamic machine to compensate for variations in slip due to variations in pressure and temperature and by means of which the hydrodynamic machine may be adjusted to vary its volumetric output if functioning as a pump or its speed if functioning as a motor, such adjustment always being made with due allowance for the temperature and pressure conditions prevailing at the time of such adjustment.

Another object is to provide a controller having means for bypassing a pump after the displacement thereof has been reduced substantially to zero.

Other objects and advantages of the invention will appear from the description hereinafter given of a controller in which the invention is embodied. In order to simplify the description, the invention will be described and claimed as applied to a pump for the reason that a pump and a motor function inversely to each other, but it is to be understood that it is equally applicable to either a pump or a motor and that the term "pump" as used herein is illustrative and not limiting.

According to the invention in its general aspect, the controller includes hydraulically actuated means for varying the displacement of the machine, a valve for controlling the hydraulically actuated means, mechanical means for operating the valve, and means responsive to variations in pressure for altering the adjustment of the valve to thereby alter the displacement of the machine. The invention also provides temperature responsive means for modifying the effect of the mechanical means and the pressure responsive means upon the valve.

The invention is exemplified by the controller shown schematically in the accompanying drawing in which the views are as follows:

Fig. 1 is a diagrammatic view showing the controller applied to a pump.

Fig. 2 is a detail view taken on the line 2—2 of Fig. 1.

The controller is shown applied to a pump of the rolling piston type which is fully illustrated and described in Patent No. 2,074,068. It is deemed sufficient to state herein that the pump has its pistons 1 fitted in cylinders arranged radially in a rotatable cylinder barrel 2 journaled upon a stationary valve shaft or pintle 3 through which liquid flows to and from the pump cylinders, that the outer ends or heads of pistons 1 react against a circular reaction surface 4 formed in a displacement varying member or slide block 5 in which cylinder barrel 2 is arranged, and that slide block 5 is fitted in a pump casing 6 which permits it to move in a horizontal plane transversely of pintle 3 but prevents it from moving in any other direction.

The arrangement is such that, when cylinder barrel 2 is rotated at a constant speed and the axis of reaction surface 4 is offset from the axis of cylinder barrel 2, the pump will deliver liquid at a rate dependent upon the distance between the two axes and in a direction dependent upon the direction in which cylinder barrel 2 is rotated and the direction in which the axis of reaction surface 4 is offset from the axis of cylinder barrel 2. That is, the direction of pump delivery may be changed either by changing the direction in which cylinder barrel 2 is rotated or by shifting the axis of reaction surface 4 to the other side of the axis of cylinder barrel 2. Also, if motive liquid were supplied to the pump cylinders, it would rotate cylinder barrel 2 and cause the pump to function as a motor.

When slide block 5 is moved to zero displacement position, that is when the axis of reaction surface 4 coincides with the axis of cylinder barrel 2, pistons 1 will not be reciprocated so that no liquid will be delivered if the machine is functioning as a pump and cylinder barrel 2 will remain stationary if the machine is functioning as a motor.

Slide block 5 is moved positively in one direction by control means, to be presently described, and it is urged in the other direction by means, such as springs 7, which exert upon slide block 5 a force less than the force which the control means is capable of exerting thereon. Slide block 5 may be moved in a direction to increase the displacement by either of these means and in the opposite direction by the other of these means as the result would be exactly the same.

As shown, cylinder barrel 2 is rotated in a clockwise direction as indicated by the arrow by means not shown so that the machine functions as a pump, springs 7 urge slide block 5 toward the right to decrease pump displacement and the control means is adapted to move slide block 5 toward the left to increase pump displacement so that the pump when functioning will draw liquid into its cylinders through a channel 8 and discharge liquid into a channel 9.

The liquid discharged by the pump may be employed to drive a hydraulic actuator such as a rotary motor 10 to the inlet of which channel 9 is connected. The liquid discharged by motor 10 may be returned directly to the pump, as by having channel 8 connected to the outlet of motor 10 and thereby forming a closed circuit, but it has been shown as discharging through a channel 11 into a reservoir 12 which is ordinarily formed in the lower part of pump casing 6 and into which channel 8 extends to enable the pump to draw its supply of liquid therefrom. Liquid is drained from casing 6 into reservoir 12 as by means of a drain channel 13.

The control mechanism has been shown supported by pump casing 6 upon the outside thereof but it is to be understood that the drawing is schematic, that the control mechanism has been shown on a large scale relative to the pump, and that controls of this type are ordinarily arranged inside the pump casing or in a sub-casing attached to the pump casing.

As shown, slide block 5 is adapted to be moved toward the left to increase pump displacement by a wedge or cam 17 arranged inside a controller casing 18 which is fastened to pump casing 6. The outer face of cam 17 is parallel to its direction of movement and in contact with a roller 19 carried by casing 18. The inner face of cam 17 is beveled or inclined for a part of its length and in contact with a roller 20 carried by an arm 21 which is fastened to slide block 5.

The arrangement is such that, when cam 17 is moved downward, it will force rollers 19 and 20 apart and thereby move slide block 5 toward the left to increase pump displacement and, when cam 17 is moved upward, it will permit springs 7 to move slide block 5 toward the right to decrease pump displacement until roller 20 passes off from the inclined part of the inner face of cam 17 and onto a part thereof which is parallel to the direction of movement of cam 17 and so located that when roller 20 is in contact therewith slide block 5 will be in its zero displacement position.

Cam 17 is connected at its lower end to a piston 22 fitted in a cylinder 23 which is formed in the lower part of casing 18 and forms with piston 22 a hydraulic servo-motor for moving cam 17 upward. Cam 17 is connected at its upper end to a piston 24 which is larger in diameter than piston 22 and fitted in a cylinder 25 formed in the upper end of casing 18. Piston 24 and cylinder 25 constitute a hydraulic servo-motor for moving cam 17 downward.

Liquid for operating servo-motors 22—23 and 24—25 is supplied by a gear pump 26 which is ordinarily arranged in the same casing as the main pump and driven in unison therewith as shown in Patent No. 2,074,068. Gear pump 26 draws liquid from reservoir 12 and discharges it into a low pressure supply channel 27 having one branch thereof communicating with the interior of cylinder 23 and another branch thereof extending through the wall of cylinder 25 into communication with a port 28 which is formed in the peripheral surface of piston 24 and is of sufficient length to remain in communication with channel 27 throughout the entire movement of piston 24. All the liquid discharged by gear pump 26 in excess of requirements is exhausted into reservoir 12 through a relief valve 29 which enables gear pump 26 to maintain a constant low pressure in channel 27 so that piston 22 is continuously urged upward by a force proportional to gear pump pressure.

Servo-motor 24—25 is controlled by a follow-up valve 33 having three spaced apart heads or pistons 34, 35 and 36 formed thereon and closely fitted in an axial bore 37 formed in piston 24. Valve 33 extends through the upper end or head 38 of cylinder 25 for connection to operating mechanism to be presently described.

Head 35 controls a port 39 which is formed in the wall of bore 37 and communicates with a duct 40 which extends through the upper end of piston 24 and provides communication between port 39 and the upper end of cylinder 25. The space between pistons 34 and 35 is connected by a duct 41 to port 28 and the space between pistons 35 and 36 communicates with a drain duct 42 which extends through the lower end of piston 24. Port 39 is exactly the same width as head 35 so that the slightest movement of valve 33 in one direction or the other opens port 39 either to duct 41 or to duct 42.

The arrangement is such that as soon as valve 33 starts to move upward, the lower edge of head 35 moves slightly above the lower edge of port 39 and permits liquid to escape from the upper end of cylinder 25 through duct 40, port 39, bore 37 and duct 42 so that liquid supplied through channel 27 by gear pump 26 to the lower end of cylinder 23 may move piston 22 upward and thereby move cam 17 and piston 24 upward substantially simultaneously with the upward movement of valve 33. Piston 24 will eject liquid from the upper end of cylinder 25 through the above described channels into the central part of casing 18 whence it may escape through a drain channel 43 which discharges into reservoir 12. As soon as valve 33 stops moving, piston 24 will bring port 39 into alinement with head 35 which will prevent further escape of liquid from the upper end of cylinder 25, thereby trapping liquid in the upper end of cylinder 25 and preventing further upward movement of piston 24.

As soon as valve 33 starts to move downward, the upper edge of head 35 moves slightly below the upper edge of port 39 and thereby permits liquid from gear pump 26 to flow through channel 27, port 28, duct 41, bore 37, port 39 and duct 40 to the upper end of cylinder 25. This liquid moves piston 24 downward substantially simultaneously with the valve 33 and causes it to move cam 17 and piston 22 downward for the reason that piston 24 has a larger effective pressure area than piston 22. As soon as valve 33 stops moving, piston 24 will bring port 39 into alinement with head 35 which will prevent further delivery of liquid to the upper end of cylinder 25 and trap the liquid therein.

Piston 24 and cam 17 are thus moved substantially simultaneously with valve 33 in the same direction and through exactly the same distance that valve 33 is moved.

Valve 33 may be shifted by mechanical means operated either manually or, for instance, in response to a given movement of a part of a machine driven by motor 10, and the adjustment of valve 33 made by the mechanical means may be altered by means responsive to variations in the pressure or the temperature of the liquid discharged by the main pump.

As shown, valve 33 is adapted to be shifted by turning a control stem 50 having fixed thereon a pinion 51 which meshes with a rack 52. Stem 50 is journaled in and rack 52 is guided by a casing 53 which may be supported by a bracket 54 attached to pump casing 6.

Rack 52 is connected by a link 55 to a lever 56 which has its left end connected to follow-up valve 33 and its right end connected to a pressure responsive mechanism which will be presently described and which holds the right end of lever 56 stationary as long as the pressure and the temperature of the pump liquid remain unchanged.

The arrangement is such that, when control stem 50 is turned in one direction or the other, pinion 51 will raise or lower rack 52 and cause link 55 to swing the left end of lever 56 upward or downward and thereby shift valve 33 upward or downward.

The right end of lever 56 is connected by a pin and slot connection 57 to one end of a lever 58 which has its other end pivoted upon a stationary pin 59 and provided intermediate its ends with a curved slot 60 having a pin 61 fitted therein. A link 62 has one of its ends pivoted upon pin 61 and its other end connected by a pin 62ª to the stem 63 of a pressure responsive piston 64 closely fitted in a cylinder 65 which is formed integral with a casing 66 attached to control casing 18.

Cylinder 65 is connected by a channel 67 to channel 9 so that the pressure created by the main pump extends into cylinder 65 and urges piston 64 upward with a force proportional to pump pressure. Piston 64 is urged downward by a helical compression spring 68 arranged around stem 63 between the upper end of casing 66 and a collar 69 which is fixed upon stem 63.

When pump pressure is constant, the force exerted by pump pressure upon piston 64 and the force exerted upon collar 69 by spring 68 causes the stem 63 to float in a balanced condition so that link 62 holds lever 58 and the right end of lever 56 substantially stationary.

When pump pressure increases, the force exerted by the liquid upon piston 64 will increase and move piston 64, stem 63 and link 62 upward against the resistance of spring 68 through a distance substantially proportional to the increase in pump pressure. Upward movement of link 62 will cause lever 58 to swing upon pin 59 and move the right end of lever 56 upward, thereby moving valve 33 downward a distance proportional to the distance piston 64 moves upward and permitting liquid to enter cylinder 25 and move piston 24 and cam 17 downward the same distance that valve 33 moves downward. Cam 17 will shift slide block 5 toward the left and thereby increase pump displacement to compensate for the increase in slip due to the increase in pressure.

When the pump pressure decreases, the force exerted upon piston 64 will decrease and permit spring 68 to move piston 64, stem 63 and link 62 downward a distance substantially proportional to the decrease in pump pressure. Downward movement of link 62 will cause lever 58 to swing upon the pin 59 and move the right end of lever 56 downward, thereby moving valve 33 upward a distance proportional to the distance piston 64 moves downward and permitting liquid to escape from cylinder 25 and the liquid in cylinder 23 to move piston 22, cam 17 and piston 24 upward the same distance that valve 33 moves upward. Upward movement of cam 17 will permit springs 7 to shift slide block 5 toward the right and thereby decrease pump displacement to compensate for the decrease in slip due to the decrease in pressure.

It is to be understood that the parts are so proportioned that the above described pressure responsive mechanism is capable of effecting only a very limited movement of valve 33 and that it may be so adjusted by means to be presently described as to impart to valve 33 in response to a variation in pressure just enough movement to cause pump delivery to be varied by an amount which is substantially equal to the variation in slip due to that variation in pressure.

Since both the mechanical means and the pressure responsive means act upon valve 33 through lever 56, it is obvious that any adjustment of pump displacement by the mechanical means must always be made in view of the pressure prevailing at the instant of such adjustment. Consequently, a given movement of rack 52 will always result in a given variation in pump displacement regardless of the pressure prevailing at the time of such adjustment.

In order that the controller may adjust the pump to compensate for variations in slip due to variations in the viscosity of the pump liquid, pin 61 is adapted to be moved along slot 60 in response to variations in temperature.

As shown, a temperature responsive member, such as a bellows 75 containing a temperature responsive fluid, is attached in adjusted position at one of its ends to control casing 18 by a bracket 76 and connected at its other end by a rod 77 to link 62 intermediate the ends thereof.

Bellows 75 is continuously subjected to the temperature of the motive fluid as by means of a shower head 78 arranged above it. As shown, liquid is supplied to shower head 78 through a pipe 79 connected to a branch of low pressure supply channel 27 through a choke 80 which permits liquid to flow to shower head 78 only at a very limited rate and thereby enables gear pump 26 to maintain a predetermined pressure in channel 27. If the main pump were connected into a closed circuit, as by connecting channel 8 to the outlet of motor 10, liquid from channel 8 would be directed to shower head 78 and gear pump 26 would supply liquid to channel 8 to make up for losses according to the usual practice. In either case, bellows 75 is bathed by the motive liquid and expands and contracts in response to variations in the temperature thereof.

When bellows 75 expands in response to an increase in the temperature of the liquid, rod 77 will swing link 62 upon pin 62ª and cause it to move pin 61 along slot 60 toward pin 59 so that a given movement of pressure responsive piston 64 results in a greater movement of valve 33, thereby increasing pump delivery by an amount equal to the increase in slip due to the increase in pressure at the higher temperature.

Conversely, when bellows 75 contracts in response to a decrease in the temperature of the liquid, rod 77 will swing link 62 upon pin 62ª and cause it to move pin 61 along slot 60 away from pin 59 so that a given movement of pressure responsive piston 64 results in a lesser movement of valve 33. Consequently, pump displacement is increased less than when the temperature was higher and the net increase in pump delivery is equal to the increase in slip due to the increase in pressure at the lower temperature.

The temperature responsive mechanism is adapted to be initially adjusted to vary its effect upon lever 62. This may be accomplished by connecting rod 77 to a pin 81 arranged in a slot 82 formed in link 62 so that, by adjusting bellows 75 upon bracket 76, pin 81 may be moved along slot 82 and thereby change the point upon lever 62 to which bellows 75 transmits motion in response to a variation in temperature.

Also, the distance between pin 81 and bellows 75 is made adjustable, as by threading rod 77 into the end of bellows 75 and fixing it in adjusted position therein by means of a suitable lock nut so that, by varying the effective length of rod 77, in 61 may be initially adjusted along slot 60 and thereby regulate the effect of the pressure responsive mechanism upon valve 33.

It is found in practice that it is difficult to reduce the displacement of rotary pumps exactly to zero for the reason that the slightest movement of the displacement varying member in one direction or the other from its neutral position causes the pump to deliver liquid at very limited rates in one direction or the other, thereby causing creeping of the actuator to which the pump is connected.

In order to prevent such creeping, the present invention provides a neutral bypass. As shown, two ports 85 and 86 are formed in the wall of cylinder 23 in the same horizontal plane, an annular groove 87 is formed in piston 22 in such a position that it will register with ports 85 and 86 when pump displacement has been reduced substantially to zero, drain channel 43 is connected to port 85 and pressure channel 9 is connected to port 86 by a channel 88.

The arrangement is such that, when piston 22 has raised cam 17 high enough to permit springs 7 to shift slide block 5 substantially to its zero displacement position, groove 87 will register with ports 85 and 86 and then any liquid delivered by the pump may flow through channels 9 and 88, port 86, groove 87 and port 85 into drain channel 43. If the pump were connected into a closed circuit, port 85 would be connected to the return side of the circuit instead of to drain so that, when groove 87 registers with ports 85 and 86, liquid could be bypassed from one side of the circuit to the other side thereof regardless of the direction of pump delivery.

The controller described herein is susceptible of various modifications and adaptations without departing from the scope of the invention as set forth in the appended claims in which the controller has been defined in connection with a pump but it is to be understood that the term "pump" as used in the claims is intended to define either a pump or a rotary hydraulic motor.

The invention is hereby claimed as follows:

1. The combination, with a pump having a displacement varying member urged toward zero displacement position, of a cam for moving said member toward maximum displacement position, a small piston and cylinder for moving said cam in one direction to thereby permit said member to move toward zero displacement position, said piston and cylinder having cooperating channels formed therein and arranged to register with each other and bypass said pump as said member approaches zero displacement position, means for continuously urging said piston in said one direction, a larger piston and cylinder for moving said cam in the opposite direction to thereby cause said cam to move said member toward maximum displacement position, means for supplying motive fluid to said larger cylinder including a valve, and means for operating said valve.

2. The combination, with a pump having a displacement varying member urged toward zero displacement position, of a cam for moving said member toward maximum displacement position, a small piston and cylinder for moving said cam in one direction to thereby permit said member to move toward zero displacement position, said piston and cylinder having cooperating channels formed therein and arranged to register with each other and bypass said pump as said member approaches zero displacement position, a source of motive liquid other than said pump, means for supplying liquid from said source to said cylinder continuously, a larger piston and cylinder for moving said cam in the opposite direction to thereby cause said cam to move said member toward maximum displacement position, means for supplying motive fluid from said source to said larger cylinder including a valve, and means for operating said valve.

3. The combination, with a pump having a displacement varying member urged toward zero displacement position, of a cam for moving said member toward maximum displacement position, a small piston and cylinder for moving said cam in one direction to thereby permit said member to move toward zero displacement position, said piston and cylinder having cooperating channels formed therein and arranged to register with each other and bypass said pump as said member approaches zero displacement position, a source of motive liquid other than said pump, means for supplying liquid from said source to said cylinder continuously, a larger piston and cylinder for moving said cam in the opposite direction to thereby cause said cam to move said member toward maximum displacement position, means for supplying motive fluid from said source to said larger cylinder including a follow-up valve arranged within said larger piston, and means for operating said valve.

4. The combination, with a pump having means for varying its displacement, of hydraulically actuated means for operating said displacement varying means, a valve for controlling said hydraulically actuated means, a mechanical device for operating said valve, a device responsive to variations in pump pressure for operating said valve, a stationary pivot, connecting means pivoted upon said pivot and connecting both of said devices to said valve to enable either or both of said devices to operate said valve, and a device connected to said connecting means and responsive to variations in temperature for modifying the effect of said pressure responsive device upon said valve.

5. The combination, with a pump having means for varying its displacement, of hydraulically actuated means for operating said displacement varying means, a valve for controlling said hydraulically actuated means, a mechanical device for operating said valve, a device responsive to variations in pump pressure for operating said valve, a stationary pivot, a lever mechanism pivoted upon said pivot and connected to said valve and to said mechanical device to enable said mechanical device to operate said valve, a connection having a pin and a slot for connecting said pressure responsive device to said lever mechanism to enable said pressure responsive device to operate said valve, manual means for shifting said pin along said slot to thereby vary the effect of said pressure responsive device upon said valve, and a temperature responsive device for shifting said pin along said slot in response to variations in temperature.

6. The combination, with a pump having means for varying its displacement, of hydraulically actuated means for operating said displacement varying means, a valve for controlling said hydraulically actuated means, a mechanical device for operating said valve, a device responsive to variations in pump pressure for operating said valve, a stationary pivot, a first lever pivoted at one of its ends upon said pivot and having a slot arranged therein intermediate the ends thereof, a second lever pivoted to the other end of said first lever and connected to said mechanical device and to said valve, a link pivoted at one of its ends to said pressure responsive device, a pin extending through said slot and connecting said link to said first lever to thereby enable either or both of said devices to operate said valve, and means for moving said pin along said slot in response to variations in the temperature of the motive liquid to thereby modify the effect of said pressure responsive device upon said valve.

7. The combination, with a pump having means for varying its displacement, of hydraulically actuated means for operating said displacement varying means, a valve for controlling said hydraulically actuated means, a mechanical device for operating said valve, a device responsive to variations in pump pressure for operating said valve, a stationary pivot, a first lever pivoted at one of its ends upon said pivot and having a slot arranged therein intermediate the ends thereof, a second lever pivoted to the other end of said first lever and connected to said mechanical device and to said valve, a link pivoted at one of its ends to said pressure responsive device, a pin extending through said slot and connecting said link to said first lever to thereby enable either or both of said devices to operate said valve, manual means for moving said pin along said slot to thereby modify the effect of said pressure responsive device upon said valve, and means for moving said pin along said slot in response to variations in the temperature of the motive liquid to thereby further modify the effect of said pressure responsive means upon said valve.

8. The combination, with a pump having a displacement varying member urged toward zero displacement position, of a cam for moving said member toward maximum displacement position, a small piston and cylinder for moving said cam in one direction to thereby permit said member to move toward zero displacement position, said piston and cylinder having cooperating channels formed therein and arranged to register with each other and bypass said pump as said member approaches zero displacement position, means for continuously urging said piston in said one direction, a larger piston and cylinder for moving said cam in the opposite direction to thereby cause said cam to move said member toward maximum displacement position, means for supplying motive fluid to said larger cylinder including a valve, mechanical means for operating said valve, means responsive to variations in the pressure created by said pump, and means responsive to variations in the temperature of the motive liquid and coacting with said pressure responsive means for modifying the effect of said mechanical means upon said valve.

9. The combination, with a pump having a displacement varying member urged toward zero displacement position, of a cam for moving said member toward maximum displacement position, a small piston and cylinder for moving said cam in one direction to thereby permit said member to move toward zero displacement position, said piston and cylinder having cooperating channels formed therein and arranged to register with each other and bypass said pump as said member approaches zero displacement position, a source of motive liquid other than said pump, means for supplying liquid from said source to said cylinder continuously, a larger piston and cylinder for moving said cam in the opposite direction to thereby cause said cam to move said member toward maximum displacement position, means for supplying motive fluid from said source to said larger cylinder including a valve, mechanical means for operating said valve, means responsive to variations in the pressure created by said pump, and means responsive to variations in the temperature of the motive liquid and coacting with said pressure responsive means for modifying the effect of said mechanical means upon said valve.

10. The combination, with a pump having a displacement varying member urged toward zero displacement position, of a cam for moving said member toward maximum displacement position, a small piston and cylinder for moving said cam in one direction to thereby permit said member to move toward zero displacement position, said piston and cylinder having cooperating channels formed therein and arranged to register with each other and bypass said pump as said member approaches zero displacement position, a source of motive liquid other than said pump, means for supplying liquid from said source to said cylinder continuously, a larger piston and cylinder for moving said cam in a positive direction to thereby cause said cam to move said member toward maximum displacement position, means for supplying motive fluid from said source to said larger cylinder including a valve arranged within said larger piston, said larger piston having ports and passages arranged therein and cooperating with said valve to cause said liquid to move said piston in the same direction said valve is moved, mechanical means for shifting said valve, and means responsive to variations in the pressure created by said pump for modifying the effect of said mechanical means upon said valve.

11. The combination, with a pump adapted to deliver liquid and having a member shiftable in opposite directions to vary pump displacement, of means for shifting said member, mechanical means for effecting operation of said member shifting means, means for transmitting motion from said mechanical means to said member shifting means, a device responsive to variations in the pressure created by said pump for adjusting said motion transmitting means to thereby modify the effect of said mechanical means upon said member shifting means, and a device operable independently of said pressure responsive device and responsive to variations in the temperature of said liquid for modifying the effect of said pressure responsive device upon said motion transmitting means.

12. The combination, with a pump having a member movable in opposite directions to increase and decrease pump displacement and means urging said member in one direction, of a servo-motor for moving said member in the opposite direction, means for supplying motive fluid to said servo-motor to operate the same including a valve for controlling said servo-motor, mechanical means for shifting said valve to thereby vary pump displacement, means for transmitting motion from said mechanical means to said valve, a device responsive to variations in pump pressure for adjusting such motion transmitting means to thereby modify the effect of said mechanical means upon said valve, and a device operable independently of said pressure responsive means and responsive to variations in the temperature of the pump liquid for modifying the effect of said pressure responsive means upon said motion transmitting means.

WALTER FERRIS.